Patented Mar. 29, 1932

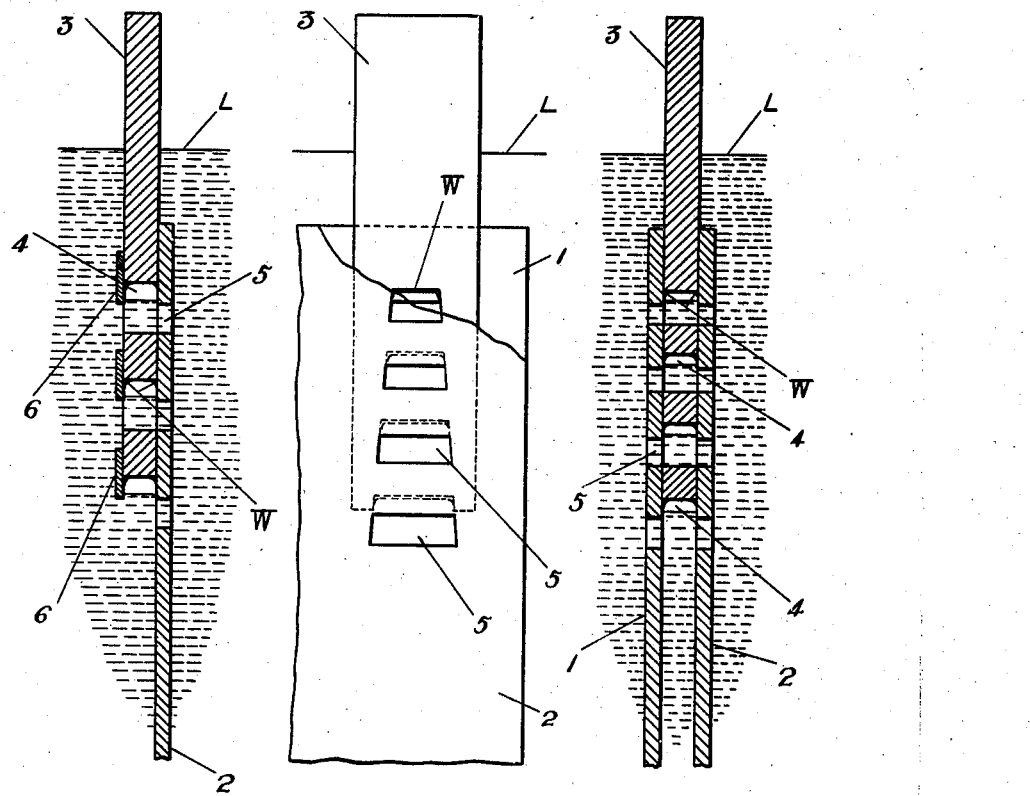

1,851,481

UNITED STATES PATENT OFFICE

KUMEO BABA, OF HITACHI-MACHI, TAGA-GUN, JAPAN, ASSIGNOR TO KABUSHIKI KAISHA HITACHI SEISAKUSHO, OF TOKYO, JAPAN

ELECTRODE FOR ELECTROLYTIC APPARATUS

Application filed June 4, 1931, Serial No. 542,140, and in Japan June 9, 1930.

The invention relates to an electrode for electrolytic apparatus, characterized by the fact that the parts in which the electrode plate or plates is or are welded to a conducting terminal, are positioned within gas pockets formed below the level of electrolytic solution, and has for its object to prevent the corrosion of the welded parts due to the action of the electrolyte.

In electrical apparatus, the parts in which the electrode plate is welded to the conducting terminal, when it is immersed directly into the electrolytic solution, are subjected to corrosion far more rapidly than the other parts, and therefore, it is in general to have the electrode to rivet together to the terminal or to position the welded part above the level of the solution. However, both of them accompany great drawbacks, because the riveting operation of the kind is difficult while the positioning of the welded parts above the level of the solution makes the distribution of electric current undesirable.

According to this invention, in order to remove these disadvantages and in order to enable the welded parts to be positioned below the level of the solution without causing corrosion, said welded parts are kept within gas pockets formed below the level of the solution.

In the accompanying drawings, given solely by way of examples, Fig. 1 is an elevation illustrating a two plate electrode welded to a terminal; Fig. 2 a longitudinal section of the same, and Fig. 3 is a view similar to Fig. 1, showing a single plate electrode.

In Figs. 1 and 2, illustrating an embodiment of two plate electrode, gas pockets 4 are formed by suitably arranging iron electrode plates 1 and 2 provided with a series of window holes 5 and an iron terminal 3 with a series of perforations. The upper edges of these gas pockets are welded as shown at W, whereby the electrode plates and the terminal are made one body. The welding operation may be preferably carried into practice as in the following manner.

The left upper corners of the perforations formed in the terminal 3 are conveniently welded to the internal surface of the left hand plate 1 by inserting an electrode for electric welding through the windows 5 formed in the right hand plate 2, and alternatively, the right upper corners of the perforations are conveniently welded to the internal surface of the right hand plate 2 by inserting an electrode for the welding through the windows formed in the left hand plate 1.

Fig. 3 shows a single plate electrode, where auxiliary pieces 6 are attached in the positions of perforations opposite to the plate 2.

As will be understood from Figs. 2 and 3, the gas pockets 4 are entirely immersed in the electrolytic solution the level of which is shown by L. By this manner the welded parts W are separated from the electrolyte, and thus the parts W can be effectively protected from corrosion so that the electrode is guaranteed for a considerable long life.

Even if the welding be insufficient and gas may leak therefrom, the bubbles of gas produced by the course of electrolysis near the parts, or the bubbles rising up along electrode plate or plates will be accumulated in the pockets until they are filled up with the bubbles so that the parts will be equally protected from corrosion.

Briefly the invention consists in surrounding the welded parts of electrode plate or plates to the conducting terminal by gas so as to protect the parts from being brought in contact with electrolyte. Of course the form of the gas pockets may be modified in various ways without departing from the scope of the invention.

The new electrode according to the invention may be used as positive and negative poles for water electrolyzing apparatus, and also as negative poles for an apparatus of electrolyzing aqueous solution of sodium chloride, etc.

Claim.

An electrode for electrolyzing apparatus, characterized by that the parts in which the electrode plate or plates is or are welded to a conducting terminal, are positioned within gas pockets formed below the level of electrolytic solution.

In testimony whereof I affix my signature.

KUMEO BABA.